US008719789B2

(12) United States Patent
Adler et al.

(10) Patent No.: US 8,719,789 B2
(45) Date of Patent: May 6, 2014

(54) MEASURING COUPLING BETWEEN COVERAGE TASKS AND USE THEREOF

(75) Inventors: Yoram Simha Adler, Haifa (IL); Rachel Tzoref-Brill, Haifa (IL); Moshe Klausner, Ramat Yishay (IL); Orna Pelleg Raz, Haifa (IL); Onn Menahem Shehory, Yahud-Monosson (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 13/041,453

(22) Filed: Mar. 7, 2011

(65) Prior Publication Data

US 2012/0233596 A1 Sep. 13, 2012

(51) Int. Cl.
*G06F 9/44* (2006.01)
*G06F 11/00* (2006.01)

(52) U.S. Cl.
USPC ........... 717/124; 717/127; 717/130; 717/131; 714/36

(58) Field of Classification Search
None
See application file for complete search history.

(56) References Cited

U.S. PATENT DOCUMENTS

| | | | | |
|---|---|---|---|---|
| 5,297,150 | A | | 3/1994 | Clark |
| 5,724,504 | A | * | 3/1998 | Aharon et al. ................ 714/33 |
| 5,761,408 | A | * | 6/1998 | Kolawa et al. .............. 714/38.1 |
| 5,896,535 | A | * | 4/1999 | Ronstrom .................... 717/131 |
| 6,085,029 | A | * | 7/2000 | Kolawa et al. ............ 714/38.13 |
| 6,356,858 | B1 | * | 3/2002 | Malka et al. ................. 702/186 |
| 6,513,154 | B1 | * | 1/2003 | Porterfield .................. 717/101 |
| 6,779,135 | B1 | * | 8/2004 | Ur et al. .................... 714/38.13 |
| 6,851,075 | B2 | * | 2/2005 | Ur et al. ......................... 714/36 |
| 6,983,446 | B2 | * | 1/2006 | Charisius et al. ............. 717/113 |
| 6,993,710 | B1 | * | 1/2006 | Coad et al. .................... 715/202 |
| 7,296,261 | B2 | * | 11/2007 | Witchel et al. ............... 717/136 |
| 7,617,484 | B1 | | 11/2009 | Fienblit et al. |
| 7,665,072 | B2 | | 2/2010 | Tillman et al. |
| 7,725,881 | B2 | * | 5/2010 | Bhat et al. .................... 717/124 |
| 8,291,384 | B2 | * | 10/2012 | Takahashi .................... 717/124 |
| 8,448,141 | B2 | * | 5/2013 | Blount et al. ................ 717/125 |
| 8,448,147 | B2 | * | 5/2013 | Raz et al. ..................... 717/130 |
| 8,527,952 | B2 | * | 9/2013 | Zeng et al. ................... 717/124 |
| 8,595,676 | B2 | * | 11/2013 | Tzoref-Brill et al. ......... 716/136 |
| 2002/0023257 | A1 | * | 2/2002 | Charisius et al. ................ 717/2 |

(Continued)

OTHER PUBLICATIONS

Erik Arisholm et al., "Dynamic Coupling Measurement for Object-Oriented Software", [Online], IEEE Aug. 2004, pp. 491-505, [Retrieved from Internet on Sep. 23, 2013], <http://ieeexplore.ieee.org/stamp/stamp.jsp?tp=&arnumber=1316867>.*

(Continued)

*Primary Examiner* — Thuy Dao
*Assistant Examiner* — Ziaul A Chowdhury
(74) *Attorney, Agent, or Firm* — Ziu Glazberg (57) ABSTRACT

Test coverage is enhanced by measuring various types of coupling between coverage tasks. The coupling measurements may be implicit coupling measurements, explicit coupling measurements, coding coupling measurements, performance coupling measurements, resource coupling measurements or the like. Coupling scores are calculated for coverage tasks and based thereon ranking of the coverage tasks or groups of coverage tasks may be determined The ranking may be utilized in selecting for which uncovered coverage task a test should be designed. The ranking may be utilized in computing a coverage measurement of a test suite. The ranking may be utilized to rank tests, based on the coverage tasks each test covers. Ranking of tests may be utilized for various purposes such as performing test selection.

22 Claims, 3 Drawing Sheets

(56) References Cited

U.S. PATENT DOCUMENTS

| | | | |
|---|---|---|---|
| 2003/0093716 A1* | 5/2003 | Farchi et al. | 714/34 |
| 2004/0249618 A1* | 12/2004 | Fine et al. | 703/2 |
| 2005/0223361 A1 | 10/2005 | Belbute | |
| 2006/0129994 A1 | 6/2006 | Srivastava et al. | |
| 2007/0074175 A1* | 3/2007 | Bengtsson et al. | 717/130 |
| 2007/0288910 A1* | 12/2007 | Bhat et al. | 717/140 |
| 2008/0022262 A1 | 1/2008 | Prakash et al. | |
| 2009/0249298 A1* | 10/2009 | Blount et al. | 717/125 |
| 2009/0319833 A1 | 12/2009 | Nir-Buchbinder et al. | |
| 2010/0131930 A1* | 5/2010 | Ben-Chaim et al. | 717/127 |
| 2010/0318958 A1* | 12/2010 | Kuester et al. | 717/104 |
| 2011/0202904 A1* | 8/2011 | Raz et al. | 717/130 |

OTHER PUBLICATIONS

Lionel C. Briand et al., "Using Coupling Measurement for Impact Analysis in Object-Oriented Systems", [Online], 1999, pp. 1-8, [Retrieved from Internet on Dec. 14, 2013], <http://squall.sce.carleton.ca/people/briand/pubs/isern-99-03.pdf>.*

Martin Hitz et al., "Measuring Coupling and Cohesion in Object-Oriented Systems", [Online], 1995, pp. 1-10, [Retrieved from Internet on Dec. 14, 2013], <http://www.isys.uni-klu.ac.at/PDF/1995-0043-MHBM.pdf>.*

Jefferson Offutt, "Investigations of the Software Testing Coupling Effect", [Online], ACM 1992, pp. 5-20, [Retrieved from Internet on Dec. 14, 2013], <http://delivery.acm.org/10.1145/130000/125473/p5-offutt.pdf>.*

Patrick Hall et al., "Software Unit Test Coverage and Adequacy", [Online], ACM 1997, pp. 366-427, [Retrieved from Internet on Dec. 14, 2013], <http://laser.cs.umass.edu/courses/cs521-621/papers/ZhuHallMay.pdf>.*

Hagai Cibulski, "TastRank: Eliminating Waste from Test-Drivan Development", Advanced Software Tools Research Seminar 2010. http://www.cs.tau.ac.il/~amiramy/SoftwareSeminar/TestRank.ppt.

IBM, "Using Dependency Analysis to Supplement Code Coverage for Targeted Testing", IP.com, IPCOM000152907D, May 17, 2007. Publisher: IBM.

\* cited by examiner

MEASURING COUPLING BETWEEN COVERAGE TASKS AND USE THEREOF

TECHNICAL FIELD

The present disclosure relates to code coverage in general, and to a determination of importance of coverage tasks, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During testing phase, developers, QA staff members, and the like test application to verify that a newly developed application operates properly. In some cases, test cases (also referred to simply as "tests") may be devised to provide stimuli to the application, and enable testing whether its operation is correct (e.g., as expected).

However, as the total number of possible stimuli is usually large, testing can only falsify the requirements (i.e., exhibit execution in which the requirements are not met), but cannot verify correctness (i.e., prove that every execution conforms to the requirements). A measurement may be used to determine whether sufficient testing of the application was performed. Coverage analysis provides one such measurement.

A coverage model defines coverage tasks. A coverage measurement may be measured by comparing the number of covered coverage tasks with the total number of coverage tasks defined by the coverage model. For example, if the coverage model defines coverage tasks for each function of the application, and a function that is invoked during execution is considered as covering the correlating coverage task, then the greater the number of different functions that are invoked during the entire testing process, the higher the coverage measurement.

Various coverage models exist. Each defines different coverage tasks. A code coverage model defines coverage tasks associated with code elements of the source code of the Software-Under-Test (SUT). Various types of code coverage models exist, such as: function coverage (a coverage task is the execution of a function), statement coverage (a coverage task is the execution of a statement), branch coverage (a coverage task is traversing a control flow edge (i.e., taking a "branch")), decision coverage (a coverage task is each control structure in the SUT (such as an if statement); each control structure should be evaluated both to true and false), condition coverage, also known as predicate coverage (a coverage task is each Boolean sub-expression used by the SUT; each Boolean expression should be evaluated both to true and false), condition/decision coverage (a combination of condition coverage and decision coverage), modified condition/decision coverage (MC/DC) (adds to the condition/decision coverage metric the requirement that each condition should affect the decision outcome independently), path coverage (a coverage task is every possible route through the code of the SUT), Exit/entry coverage (a coverage task is every possible invocation and return of each function), and the like.

After coverage is measured, review and analysis of the testing phase may be performed to improve it based on the measured coverage. One example would be to determine whether "sufficient" testing was performed. In some cases, should the coverage measurement by above a predetermined threshold, it may be concluded that "sufficient" testing was performed. Another example would be to design a test that would cover an uncovered coverage task. Yet another example would be to perform test selection: selection of a subset of executed tests that would induce the same coverage measurement. Test selection may enable future testing to be more efficient by reducing duplicity. Yet another example would be to group several related uncovered coverage tasks into sets, and thus reducing the total number of items the user needs to review.

BRIEF SUMMARY OF THE INVENTION

One exemplary embodiment of the disclosed subject matter is a computer-implemented method performed by a computerized device, comprising: obtaining coverage tasks, each coverage task is associated with a code element of a Software-Under-Test (SUT); for each coverage task: with respect to substantially all other coverage tasks, computing coupling measurements of the coverage task with the other coverage tasks; and aggregating the coupling measurements of the coverage task to a coupling score of the coverage task. The method further comprises ranking the coverage tasks based on the coupling scores.

Another exemplary embodiment of the disclosed subject matter is a computerized apparatus having a processor and a memory device, comprising: a coverage task obtainer operative to obtain coverage tasks associated with a Software-Under-Test (SUT), each coverage task is associated with a code element of the SUT; a coupling measurements determinator operative to compute coupling measurements of a coverage task with other coverage tasks; a coupling score determinator operative to aggregate the coupling measurements of the coverage task to a coupling score of the coverage task; and a coverage task ranker operative to rank the coverage tasks based on the coupling scores.

Yet another exemplary embodiment of the disclosed subject matter is a computer program product comprising: a non-transitory computer readable medium; a first program instruction for obtaining coverage tasks, each coverage task is associated with a code element of a Software-Under-Test (SUT); a second program instruction for performing with respect to each coverage task: with respect to substantially all other coverage tasks, computing coupling measurements of the coverage task with the other coverage tasks; aggregating the coupling measurements of the coverage task to a coupling score of the coverage task; a third program instruction for ranking the coverage tasks based on the coupling scores; and wherein the first, second, and third program instructions are stored on the non-transitory computer readable media.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to determine which coverage task is more important. Another technical problem is to prioritize coverage tasks so as to decide to which coverage task a user, such as a developer, should focus his attention first. Yet another technical problem is to determine which test is of more importance.

One technical solution is to determine coupling measurement of a first coverage task (associated with a first code element) with respect to a second coverage task (associated with a second code element). In some exemplary embodiments, the coupling measurement may be an explicit coupling measurement, such as indicated by an invocation of the second code element by the first code element. The coupling measurement may be an implicit coupling measurement, such as a coding coupling measurement, a resource coupling measurement, a performance coupling measurement, or the like. In some exemplary embodiments, a plurality of coupling measurements with respect to a plurality of different coverage tasks may be aggregated into a coupling score indicative of association of the coverage task with other coverage tasks. In some exemplary embodiments, a plurality of types of coupling measurements may be measured. In some exemplary embodiments, coupling measurements of different types may be treated separately, therefore a plurality of coupling scores of different types may be calculated, based on different types of coupling measurements. The plurality of coupling scores of different types that are associated with the same coverage task may be utilized to compute the coverage score of the coverage task. In some exemplary embodiments, the coupling score may be a weighted average of the different coupling scores, each calculated based on different coupling measurements. In some exemplary embodiments, a coverage task associated with a higher coupling score may be deemed as having a higher rank, priority, importance, or the like, than a coverage task having a lower coupling score. Another technical solution is to utilize the coupling score to prioritize coverage tasks. Yet another technical solution is to utilize a determined priority of coverage tasks in determining a coverage measurement of an executed test suite. Yet another technical solution is to utilize the determined priority of coverage tasks in determining which coverage task should be covered by a test being designed. Yet another technical solution is to rank test based on the coupling ranks of the coverage tasks that are covered by each test. Ranking of the tests may be useful for test selection, such as for example, by preferring tests that cover tasks with higher coupling scores. Yet another technical solution is to rank groups of coverage tasks, such as determined by substring hole-analysis, based on aggregated coupling scores of the member coverage tasks of each group.

One technical effect of utilizing the disclosed subject matter is to distinguish higher priority coverage tasks from lower priority coverage tasks. Coverage tasks that are deemed as coupled strongly with additional coverage tasks may be a source of greater erroneous potential, and therefore should be covered. Another technical effect is to enable reduction in the size of a test suite by omitting redundant tests that cover coverage tasks which are deemed as lower priority, thereby achieving greater efficiency in consecutive executions of the test suite. In some exemplary embodiments, the outcome of test selection may be enhanced due to the deference given to tests covering higher priority coverage tasks, as is further disclosed hereinbelow. Yet another technical effect is to assist a user to better understand outcomes of coverage measurements, so as to enable the user to make better decisions based upon the coverage measurements. The user may be assisted by automatic means, which may assist in reducing his need to inspect each and every coverage task manually to determine its importance.

Figure 1:
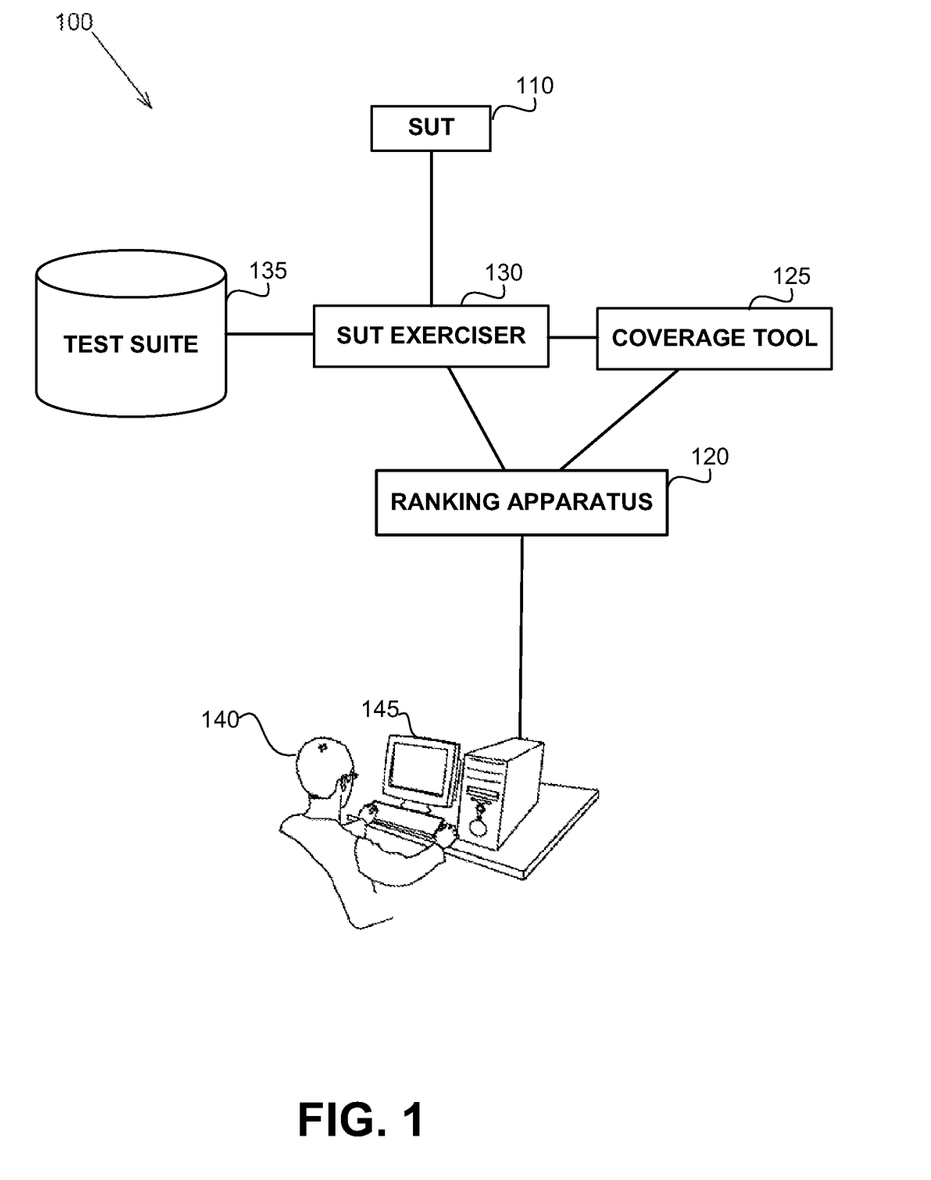
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

The environment 100 may comprise a Software-Under-Test (SUT) 110 having a form of source code representation. The SUT 110 may be any form of computer program, such as a non-limiting example, a software, a firmware, an application, a web application, a smartphone app, or the like.

In some exemplary embodiments, a coverage tool 125, such as implemented using software, firmware, hardware, combination thereof, or the like, may be operative to determine coverage tasks based on the SUT 110. The coverage tool 125 may utilize a code coverage model, such as function coverage, statement coverage, branch coverage, decision coverage, condition coverage, condition/decision coverage, modified condition/decision coverage (MC/DC), path coverage, exit/entry coverage, and the like. The code coverage model may define for which code elements of the SUT 110, a coverage task is created. It will be understood that a "code element" may be any element of the source code representation of the SUT 110, binary code representation of the SUT 110, or any other code representation of the SUT 110. A function may be a code element that pertains to function coverage, a statement may be a code element that pertains to statement coverage, an edge in a Control Flow Graph (CFG) may be a code element that pertains to branch coverage, and so forth.

In some exemplary embodiments, the coverage tool 125 is further operative to determine a coverage measurement based on execution of the SUT 110. The execution of the SUT 110 may be performed during the testing phase. In some exemplary embodiments, the execution may be performed by an SUT exerciser 130. The SUT exerciser 130 may be a computerized apparatus, implemented using software, firmware, hardware, combination thereof, or the like. The SUT exerciser 130 may be configured to execute the SUT 110 using tests. The tests may be a part of a test suite 135, which may be retained in a database, storage device, storage server, Hard Drive, Flash disk, Random Access Memory (RAM), or the like. In some exemplary embodiments, the SUT exerciser 130 may apply the test suite 135 on the SUT 110 in a batch process.

In some exemplary embodiments, a ranking apparatus 120, implemented using software, firmware, hardware, combination thereof, or the like, may be configured to provide ranking of objects, in accordance with the disclosed subject matter. The ranked objects may be coverage tasks, ranked in accordance with their relative importance. The ranked objects may be groups of coverage tasks, ranked in accordance with the aggregated relative importance of their members. The ranked objects may be tests, ranked in accordance with the aggregated relative importance of coverage tasks that are covered by the tests.

In some exemplary embodiments, ranking may be determined based on coupling scores. The coupling score of a coverage task may be an aggregation of coupling measurements of the coverage task with other coverage tasks. A coupling measurement of a coverage task and another coverage task may be a measurement of how much the coverage task affects or is affected by the other coverage task. In some exemplary embodiments, the coupling measurement may be formulated as a number, where the higher the number, the coupling of a first coverage task with a second coverage task is greater. The coupling score may be an aggregation of the coupling measurements into a single score. Aggregation may be achieved by calculating an average of the coupling measurements, by summing the coupling measurements, or the like. In some exemplary embodiments, the coupling scores may be normalized For example, the coupling scores may be normalized to correlate to a standard deviation from the average. Other formulations of the coupling scores may be possible to a person of ordinary skill in the art.

In some exemplary embodiments, the coupling measurement is an asymmetric property, where a first coverage task may be considered closely coupled to as second coverage task, but the second coverage task may not be considered as closely coupled to the first coverage task thus given different coupling measurements.

In some exemplary embodiments, the coupling score may be calculated based on different types of specific coupling measurements, as are disclosed hereinbelow. A plurality of coupling scores associated with each type of coupling measurement may be calculated. The plurality of type-associated coupling scores of a coverage task may be aggregated into a coupling score of the coverage task. The coupling score may be a weighted average of the different types coupling measurements, a summation of the different types of coupling measurements (with or without using predetermined weights to each different type of coupling), or the like.

In some exemplary embodiments, based upon the coupling scores, ranking of the coverage tasks and/or groups of coverage tasks and/or tests covering coverage tasks may be determined The ranking may be utilized in prioritizing the above-mentioned objects, such as when determining whether sufficient coverage was reached, when determining which coverage tasks should be covered by a newly designed test (either manually designed, automatically generated, a combination thereof, or the like), when determining a subset the test suite during test selection, when determining to which group of coverage tasks the developer's attention should be focused first, or the like.

In some exemplary embodiments, a user 140, such as a developer, a QA staff member, a tester, a designer, or the like, may interact with the computerized environment 100. For simplicity, the user 140 may be generally referred to as the developer. The user 140 may utilize a Man-Machine Interface (MMI) 145 such as a terminal, a display, a keyboard, an input device or the like. The user 140 may design, develop, test, or the like, the SUT 110. The user 140 may design, update, maintain, or the like, the test suite 135. The user 140 may invoke the SUT exerciser 130, provide it with commands, rules, parameters, preferences, or the like. The user 140 may interact with the coverage tool 125 to view coverage information, provide commands, rules, parameters, preferences, or the like with respect to coverage analysis. The user 140 may view coverage information that took into account the ranking of the ranking apparatus 120. The user 140 may provide the ranking apparatus 120 with commands, rules, parameters, preferences, or the like. Based upon coverage information, the user 140 may determine to design a new test, to modify the SUT 110, fix a bug, update the test suite 135, or the like.

Figure 2:
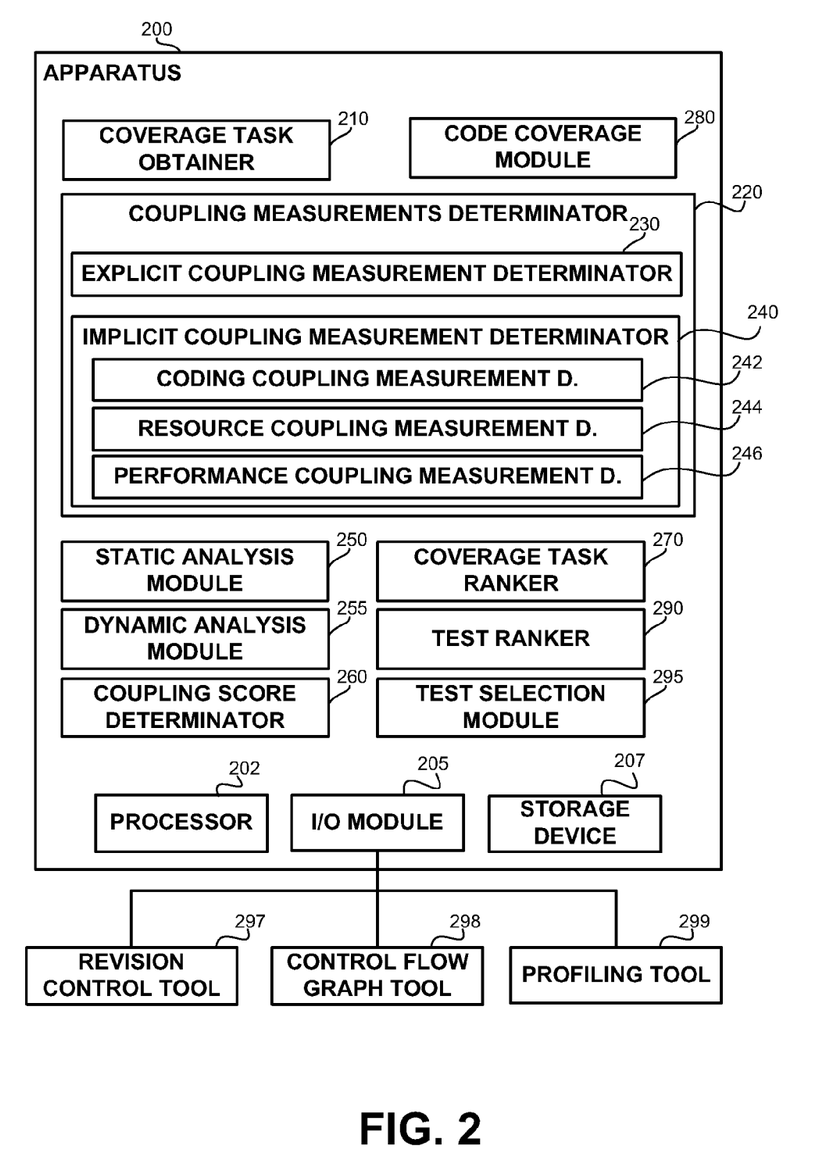
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 120 of FIG. 1, may be configured to provide for a ranking of objects, in accordance with the disclosed subject matter.

In some exemplary embodiments, a coverage task obtainer 210 may be configured to obtain coverage tasks associated with the SUT. The coverage tasks may be obtained from a coverage tool, such as 125 of FIG. 1. The coverage tasks may be obtained from a code coverage module 280.

In some exemplary embodiments, a coupling measurements determinator 220 may be operative to measure coupling measurements. In some exemplary embodiments, a coupling measurement is measured between a first coverage task and a second coverage task. In some exemplary embodiments, the coupling measurement may be asymmetric, such that the coverage measurement of the first coverage task with respect to the second coverage task may be different than the coverage measurement of the second coverage task with respect to the first coverage task.

In some exemplary embodiments, coupling measurements of different types may be measured. A coupling measurement may be an explicit coupling measurement, an implicit coupling measurement, an aggregation thereof, or the like.

In some exemplary embodiments, an explicit coupling measurement determinator 230 may be operative to measure an explicit coupling measurement. Explicit coupling measurement may be affected by explicit interactions between a first and a second coverage tasks. For example, in case the coverage tasks correspond to functions of the SUT, an exemplary explicit coupling measurement may be indicative of the first function calling or being called by the second function. In some exemplary embodiments, the explicit coupling measurement may be asymmetric, may be determined dynamically, statically, or the like, may be relative, absolute, or the like, may be formulated by a number, normalized, or the like. In some exemplary embodiments, the coupling may be relative, so that in case the first function calls a thousand functions, one of which is the second function, the explicit coupling measurement is lower than in the case that only ten other functions are called. In some exemplary embodiments, a different weight may be given to being invoked than to invoking, such as invoking other functions may be considered as a more/less substantial evidence to explicit coupling between the coverage tasks. In some exemplary embodiments, a probability of invoking the function may be used, such as a static probability (e.g., out of the ten possible invocations of functions, two are of the second function; as another example: the probability of performing each function invocation may be estimated using static analysis measures), dynamic probability (e.g., out of ten execution of the first function, the second function was invoked a total of eight times and/or the second function was invoked in seven of those times (e.g., in one operation of the first function, the second function was invoked twice)), or the like. It will be noted that explicit coupling is not limited to function coverage, and may be applied on other coding coverage models. Invocations may be determined based on files, statements, basic blocks, functions, or the like. Invocations may be determined using a Control Flow Graph (CFG) tool 298, as is known in the art.

In some exemplary embodiments, an implicit coupling measurement determinator 240 may be operative to measure an implicit coupling measurement. An implicit coupling measurement may be indicative of a coupling between the coverage tasks which is not explicit in the code elements. As is explained hereinbelow, some exemplary implicit coupling measurements may be coding coupling, resource coupling, performance coupling, and the like. In some exemplary embodiments, the implicit coupling measurement may be asymmetric, may be determined dynamically, statically, or the like, may be relative, absolute, or the like, may be formulated by a number. In some exemplary embodiments, the implicit coupling measurement may be an aggregated value, such as a weighted average or summation, of several implicit coupling measurements of different types.

In some exemplary embodiments, a coding coupling measurement determinator 242 may be operative to measure coding coupling measurement of the first coverage tasks with respect to the second coverage task. In some exemplary embodiments, coding coupling measurement is an indication, based on operations on the source code or any other representation of the SUT, that two coding elements are associated. In some exemplary embodiments, a revision control tool 297, as is known in the art, may be operative to monitor revisions made to source code of the SUT. Based upon revisions, certain inferences may be made as to the couplings of coding elements. For example, in case that there is a strong correlation between updating a first code element and of updating a second code element, then the coding coupling measurement may be relatively high. In some exemplary embodiments, the coding coupling measurement may be asymmetric in the sense that there is a strong correlation between updating the first code element and updating the second code element, but there may be a weak correlation between updating the second code element and updating the first code element. In some exemplary embodiments, the coding coupling measurement may be measured by determining a portion of modifications made to the first code element that are associated with a modification made to the second code element out of the total modifications made to the first code element. For simplicity, two different associated modifications made to the first and second code elements may be referred to as modifications made to both the first and second code elements. In some exemplary embodiments, associated modifications may be modifications made in within predetermined timeframe, optionally by the same developer; made contemporaneously; made with respect to the same update, bug, feature or the like; or the like. In some exemplary embodiments, a revision control tool 297 may provide an Application Programming Interface (API) enabling the apparatus 200 to obtain pertinent data associated with coding coupling.

In some exemplary embodiments, a resource coupling measurement determinator 244 may be operative to measure resource coupling measurements. Resource coupling measurements may be determined based on usage of a shared resource, such as for example, a global variable, a shared memory address, a cache line, a semaphore, or the like. In some exemplary embodiments, the resource coupling may be relative (e.g., out of the total usages of resources/shared resources), absolute (e.g., a number of shared usages), or the like. The resource coupling may be statically estimated, dynamically determined, or the like. In some exemplary embodiments, resource coupling may be applied to SUTs exhibiting concurrent features, such as having a plurality of threads. In case of concurrent SUTs, resource coupling may be measured with respect to substantially concurrent usage of the shared resource.

In some exemplary embodiments, a performance coupling measurement determinator 246 may be operative to measure performance coupling measurements. Performance coupling measurement may be indicative of the first code element having an effect on a performance property associated with execution of the second code element. The effect may be in on a performance aspect, such as exhibited by performance metrics, for example, CPU utilization, memory usage, throughput, wait time, execution time, or the like. In some exemplary embodiments, the performance coupling may be determined using dynamic analysis, static analysis, or the like. In some exemplary embodiments, performance coupling measurements may be indicative of correlations (either positive or negative) between covering the first coverage task and of a performance metric while covering the second coverage task. In some exemplary embodiments, the correlation may be measured by comparing performance in executions covering the second coverage task in which the first coverage task is not covered and executions covering the second coverage task in which the first coverage task is covered. In some exemplary embodiments, performance coupling may be used with respect to concurrent SUTs. Effects on performance may be measured in cases in which a first concurrent entity (e.g., thread, process, or the like) covers the first coverage task and a second concurrent entity covers the second coverage task. Performance may be considered effected in predetermined timeframes in which both coverage tasks are covered by the two different concurrent entities. In some exemplary embodiments, performance may be measured using a profiling tool 299, as is known in the art.

In some exemplary embodiments, an analysis module such as a static analysis module 250 and/or a dynamic analysis module 255 may be useful for analyzing operation of the SUT to determine information pertinent to the coupling measurement determinator 230. In some exemplary embodiments, a static analysis module 250 may be operative to determine aspects of the behavior of the SUT without executing the SUT. The analysis may be performed based on SUT representation such as the source code, binary code or the like, such as building a CFG, identifying shared resources, identifying declared critical sections, or the like. In some exemplary embodiments, the dynamic analysis module 255 may be operative to determine aspects of the behavior of the SUT based on executions of the SUT. The dynamic analysis module 255 may monitor executions on-the-fly, review traces of previous execution, or the like. In some exemplary embodiments, the dynamic analysis module 255 may instrument the SUT's source code, binary, or similar representation with instructions useful for logging and/or monitoring operation of the SUT during execution thereof.

In some exemplary embodiments, a coupling score determinator 260 may be configured to aggregate the coupling measurements of a coverage task (each with respect to different coverage tasks) into a coupling score. For example, the coupling measurements determinator 220 may determine a first coupling measurement for a first coverage task with respect to a second coverage task, a second coupling measurement for the first coverage task with respect to a third coverage task, a third coupling measurement for the first coverage task with respect to a fourth coverage task, and so forth. The coupling score determinator 260 may aggregate the first, second and third coupling measurements of the first coverage task and compute, based upon them, a coupling score for the first coverage task. The aggregation may be performed by computing an average of the various coupling measurements, by summing the coupling measurements, or the like. The coupling score may be indicative of a total measurement of couplings between the first coverage task and all other coverage tasks. In some exemplary embodiments, intermediate coupling scores of different types may be calculated based on coupling measurements of the same type. The intermediate coupling scores may be used to compute the coupling scores, such as by computing an average, a weighted average, a summation, or a similar computation. In some exemplary embodiments, the coupling score may be normalized.

In some exemplary embodiments, a coverage task ranker 270 may be configured to rank the coverage tasks according to their corresponding coupling scores. The ranking may be utilized to prioritize the coverage tasks. In some exemplary embodiments, a subset of the coverage tasks may be ranked, such as uncovered coverage tasks or covered coverage tasks. In some exemplary embodiments, uncovered coverage tasks may be ranked and order so as to enable a user, such as 140 of FIG. 1, to design a test that covers the highly-ranked uncovered coverage tasks. In such a scenario, the user may select the highly-ranked uncovered coverage task and design the test in accordance with them. In some exemplary embodiments, a test generator (not shown) may be configured to generate, either automatically, or semi-automatically, a test based on the selected uncovered coverage tasks. In some exemplary embodiments, the coverage task ranker 270 may be configured to rank groups of coverage tasks. In case the several coverage tasks are grouped together, such as in the case of substring hole-analysis, the groups themselves may be ranked based on an aggregated coupling scores of the members in the groups. Substring hole-analysis is disclosed in Yoram Adler, Eitan Farchi, Moshe Klausner, Dan Peleg, Orna Raz, Moran Shochat, Shmuel Ur and Aviad Zlotnick, "Automated Substring Hole Analysis", ICSE 2009, Yoram Adler, Eitan Farchi, Moshe Klausner, Dan Pelleg, Orna Raz, Moran Shochat, Shmuel Ur and Aviad Zlotnick, "Advanced Code Coverage Analysis Using Substring Holes", ISSTA 2009, which are both hereby incorporated by reference. In some exemplary embodiments, aggregation may be calculated by computing an average of coupling scores of the members.

In some exemplary embodiments, a code coverage module 280 may provide functionality such as provided by the coverage tool 125 of FIG. 1. The code coverage module 280 may generate the coverage tasks. The code coverage module 280 may generate the coverage tasks based on a predetermined code coverage metric. The code coverage module 280 may be configured to determine which coverage tasks are covered and which are not by a test suite. In some exemplary embodiments, the code coverage module 280 may determine coverage by monitoring execution of the SUT, by reviewing logs of execution of the SUT, or the like. In some exemplary embodiments, the code coverage module 280 may be configured to compute a coverage measurement for the test suite, such as for example based on a portion of coverage tasks that was covered in the test suite. In some exemplary embodiments, the coverage measurement may take into account the ranking of the uncovered coverage task. For example, in case a number of coverage tasks are uncovered, a coverage measurement may be higher in case that a uncovered coverage tasks are of relative low ranking. An average of the rankings may be taken into account. In some exemplary embodiments, the maximum ranking out of all the uncovered coverage tasks may be taken into account to compute coverage measurement. The ranking may be used in computing the coverage measurements in other manners.

In some exemplary embodiments, a test ranker 290 may be configured to determine a coupling score for a test. In some exemplary embodiments, the test ranker 290 may be configured to prioritize tests based on determined coupling scores of the tests. In some exemplary embodiments, the test ranker 290 may determine for a test, such as for example a test of the test suite 135 of FIG. 1, a coupling score based on the coupling scores of the coverage tasks that are covered by the test. Based upon execution of the test, coverage tasks that are covered by the test may be identified (e.g., based upon logs, based on on-the-fly determination, or similar dynamic analysis techniques). In some cases, static analysis may be utilized to determine coverage tasks that are likely to be covered by executing the test. In some exemplary embodiments, the coupling scores of the covered coverage tasks may be aggregated into a coupling score of the test. Aggregation may be performed by summing the coverage tasks (and therefore giving deference to tests that cover many coverage tasks), by computing average of the covered tasks (and therefore giving deference to tests whose average covered coverage task is relatively important), by computing the highest coupling score of a covered coverage task (and therefore giving deference to tests based on the most "important" covered coverage task), or the like.

In some exemplary embodiments, a test selection module 295 may be configured to perform test selection of a subset of a set of tests, such as the test suite 135 of FIG. 1. "Test selection" is a selection of a subset of tests, out of a set of tests (e.g., a test suite). The subset may provide subset a substantially equivalent coverage measurement to that provided by the set of tests. For example, tests that cover only coverage tasks that are already covered by one or more other tests may be omitted without decreasing the coverage. In some cases the subset may be selected as to provide the tests that are considered to be "the best", while adhering to some limitation, such as on the resources allocated for executing the test suite (e.g., limited time). The test selection module 295 may perform test selection by taking into account the coupling scores of the tests. In some exemplary embodiments, test selection may be performed iteratively. In each iteration a test of the test suite may be selected and added into the subset. The selected test may be a test that covers at least one coverage task that is not already covered by the previously selected tests ("not-yet-covered tasks"). In some exemplary embodiments, the test that covers the highest number of not-yet-covered tasks may be selected. In case two or more tests have the highest number of not-yet-covered tasks, the tests with the higher coupling score may be preferred and selected. The iterative process may stop once all the coverage tasks that are covered by the subset are also covered by the subset or if some resource limit of executing the already selected tests is reached (e.g the time needed to run the selected tests). In some exemplary embodiments, the test selection process may provide a subset that does not cover all the coverage tasks covered by the test suite, but still provide of a substantially equivalent coverage measurement. In some exemplary embodiments, failing to cover a coverage task with a low coupling score may not decrease the coverage measurement in a substantial manner In some exemplary embodiments, the test selection may be performed such that a test of a coupling score below a predetermined threshold is never selected. In some exemplary embodiments, the test selection may be performed such that a coverage task having a coupling score below a predetermined threshold need not (but may) be covered by the selected subset.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1. The I/O module 205 may provide for an interface to external modules, tools, devices, or the like, such as the revision control tool 297, the control flow graph tool 298, the profiling tool 299, the test suite 135 of FIG. 1, the coverage tool 125 of FIG. 1, or the like.

In some exemplary embodiments, the apparatus 200 may comprise a storage device 207. The storage device 207 may be a hard disk drive, a Flash disk, a Random Access Memory (RAM), a memory chip, or the like. In some exemplary embodiments, the storage device 207 may retain program code operative to cause the processor 202 to perform acts associated with any of the subcomponents of the apparatus 200. In some exemplary embodiments, the storage device 207 may retain the values of coupling measurements, the coupling scores, the coverage measurement, the selected subset of tests, or the like.

Figure 3:
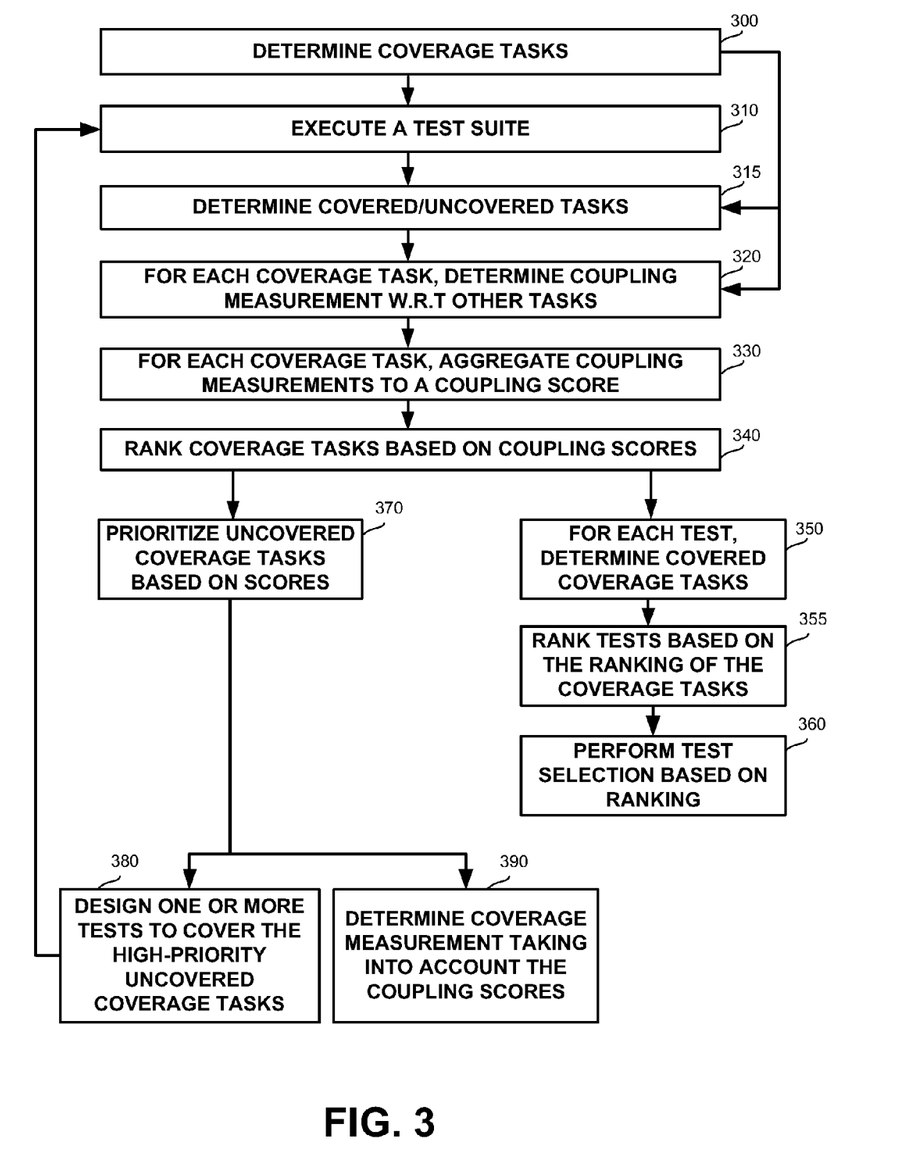
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, coverage tasks may be determined The coverage tasks may be determined by a code coverage module, such as 280 of FIG. 2, or by a coverage tool, such as 125 of FIG. 1.

In step 310, a test suite may be executed. In some exemplary embodiments, the test suite may be executed by an SUT exerciser, such as 130 of FIG. 1. In some exemplary embodiments, the test suite may be executed manually by a user, such as 140 of FIG. 1.

In step 315, a determination as to which coverage task is covered by the test suite may be performed. The determination may be performed by a code coverage module, such as 280 of FIG. 2, or by a coverage tool, such as 125 of FIG. 1.

In step 320, for each coverage task, coupling measurement with respect to other tasks may be determined. The coupling measurement may be determined by a coupling measurements determinator, such as 220 of FIG. 2. The coupling measurement may be explicit coupling measurement, implicit coupling measurement, combination thereof, or the like. In some exemplary embodiments, the measurements may be determined using external tools, such as for example, a revision control tool, such as 297 of FIG. 2, a control flow graph tool, such as 298 of FIG. 2, and a profiling tool, such as 299 of FIG. 2.

It will be noted that analysis of the coverage tasks may be performed without execution of the test suite, such as by performing static analysis. Static analysis may be performed in lieu or in addition to dynamic analysis. Static analysis may be performed by a static analysis module, such as 250 of FIG. 2. In case the test suite is executed in step 310, dynamic analysis may be performed by a dynamic analysis module, such as 255 of FIG. 2.

In step 330, coupling measurements of a coverage task may be aggregated to a coupling score. The coupling score may be computed by a coupling score determinator, such as 260 of FIG. 2.

In step 340, coverage tasks may be ranked based on the coupling scores. Ranking may be performed by a coverage task ranker, such as 270 of FIG. 2.

In step 350, coverage tasks covered by each test may be determined The determination may be based on past executions, based on dynamic analysis, based on static analysis, or the like. The determination may be performed by a test ranker, such as 290 of FIG. 2. Based upon the coverage tasks and their ranking, in step 355, the tests may be ranked as well. The ranking of the tests may be performed by a test ranker, such as 290 of FIG. 2. The ranked tests may be utilized in performing a test selection in step 360. Test selection may be performed by a test selection module, such as 295 of FIG. 2.

In step 370, uncovered coverage tasks may be prioritized based on the coupling scores. In some exemplary embodiments, other sets of coverage tasks may be prioritized, such as all coverage tasks, all covered coverage tasks, or the like. In some exemplary embodiments, groups of coverage tasks may be prioritized based on the coupling scores of the member coverage tasks of the groups. Prioritization may be based upon ranking performed by a coverage task ranker, such as 270 of FIG. 2. In some exemplary embodiments, a subset of the ranked coverage tasks may be selected (e.g., uncovered coverage tasks only). In such a case, the partial ordering enforced by the original ranking with respect to all coverage tasks may induce the prioritization of the subset as well.

In some exemplary embodiments, based on the uncovered coverage tasks, one or more new tests may be designed in step 380. The new tests may be designed to cover uncovered tests which are highly prioritized in step 370. In some exemplary embodiments, designing the tests may be done automatically, manually, in combination thereof, or the like. In response to creation of the new tests, the test suite may be updated, and the updated test suite may be re-executed (step 310).

In step 390, a coverage measurement may be determined The coverage measurement may be determined based upon the coupling scores of the covered/uncovered coverage tasks. The coverage measurement may be determined by a code coverage module, such as 280 of FIG. 2. Based on the coverage measurement, a user, such as 140 of FIG. 1, may determine whether or not to enhance the test suite of the SUT by designing additional tests. In some exemplary embodiments, step 380 may be performed. In other exemplary embodiments, the tests may be designed without specific consideration of the coupling scores.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
  obtaining coverage tasks, each coverage task is associated with a code element of a Software-Under-Test (SUT);
  computing a coupling score for each coverage task, wherein said computing the coupling score for a coverage task comprises:
  for each other coverage task, computing coupling measurements of the coverage task with all other coverage tasks; and
  one or more measurements selected from a group consisting of an explicit coupling measurement and an implicit coupling measurement, wherein the explicit coupling measurement of a first coverage task and a second coverage task is indicative of an interaction between a first code element of the first coverage task and a second code element of the second coverage task, wherein the explicit coupling measurement is a total number of invocations of the first code element by the second code element and of invocations of the second code element by the first code element; and wherein an invocation of the first code element by the second code element is given a different weight than an invocation of the second code element by the first code element; and wherein the implicit coupling measurement of a the first coverage and the second coverage task is indicative of an implicit association between the first code element and the second code element; and aggregating the coupling measurements between the coverage task and all other coverage tasks into the coupling score of the coverage task; and ranking the coverage tasks based on the coupling scores; whereby the coupling measurement is computed with respect to each pair of coverage tasks in order to compute the coupling score.

2. The computer-implemented method of claim 1, wherein the implicit coupling measurement is a coding coupling measurement of the first code element with respect to the second code element, wherein the coding coupling measurement is measured as a relative portion of source code modifications made to both the first and second code elements in respect to all source code modifications made to the first code element.

3. The computer-implemented method of claim 1, wherein the implicit coupling measurement is a resource coupling measurement indicative of a use of a shared computer resource.

4. The computer-implemented method of claim 1, wherein the implicit coupling measurement is a performance coupling measurement indicative of the first code element having an effect on a performance property associated with execution of the second code element.

5. The computer-implemented method of claim 1, wherein said aggregating comprises computing a type-specific coupling score to each type of coupling measurement and applying a corresponding weight to each type-specific coupling score.

6. The computer-implemented method of claim 1, wherein said computing a coupling measurement comprises statically analyzing the source code to determine the coupling measurement.

7. The computer-implemented method of claim 1, wherein said computing a coupling measurement comprises dynamically analyzing the source code to determine the coupling measurement with respect to each pair of coverage tasks, wherein said dynamically analyzing comprises monitoring execution of tests.

8. The method of claim 1, further comprises, manually, automatically, or in a combination thereof:
executing a test suite;
determining which of the coverage tasks is covered; and
computing a coverage measurement based on uncovered coverage tasks and their respective ranking.

9. The method of claim 1, further comprises, manually, automatically, or in a combination thereof:
executing a test suite;
determining which of the coverage tasks is covered; and
selecting a coverage task to cover out of the uncovered coverage tasks, wherein said selecting is performed based on the ranking.

10. The method of claim 9 further comprises, manually, automatically, or in a combination thereof, designing a test to cover the selected coverage task.

11. The computer-implemented method of claim 1, wherein said ranking is performed with respect to groups of coverage tasks, wherein each group having one or more member coverage tasks, is ranked based on an aggregated coupling scores of the member coverage tasks.

12. The computer-implemented method of claim 1, further comprising:

for each test comprised by a test suite, computing a coupling score of a test, wherein said computing comprises:
identifying coverage tasks that are covered by the test, and aggregating the coupling scores of the identified coverage tasks to the coupling score of the test;
prioritizing the tests of the test suite based on the computed coupling scores of the tests.

13. The computer-implemented method of claim 12, further comprising performing test selection of a subset of the test suite having substantially equivalent coverage measurement to the coverage measurement of the test suite, wherein the test selection is performed so as to give deference to a coupling score of a test.

14. A computerized apparatus having a processor and a memory device, comprising:
a coverage task obtainer operative to obtain coverage tasks associated with a Software-Under-Test (SUT), each coverage task is associated with a code element of the SUT;
a coupling measurements determinator operative to compute coupling measurements of a coverage task with all other coverage tasks, whereby a coupling measurement is computed with respect to substantially each pair of coverage task in order to compute a coupling score; and
one or more measurements selected from a group consisting of an explicit coupling measurement and an implicit coupling measurement, wherein the explicit coupling measurement of a first coverage task and a second coverage task is indicative of an interaction between a first code element of the first coverage task and a second code element of the second coverage task, wherein the explicit coupling measurement is a total number of invocations of the first code element by the second code element and of invocations of the second code element by the first code element; and wherein an invocation of the first code element by the second code element is given a different weight than an invocation of the second code element by the first code element; and wherein the implicit coupling measurement of a the first coverage and the second coverage task is indicative of an implicit association between the first code element and the second code element; and
a coupling score determinator operative to compute the coupling score for each coverage task by aggregating the coupling measurements between the coverage task and all other tasks into the coupling score of the coverage task; and
a coverage task ranker operative to rank the coverage tasks based on the coupling scores.

15. The computerized apparatus of claim 14, further comprising:
a code coverage module operative to generate the coverage tasks based on a predetermined code coverage metric; and
said code coverage module is further operative to determine which coverage tasks are covered during execution of a test suite and to determine a coverage measurement.

16. The computerized apparatus of claim 15, wherein said coverage task ranker is configured to rank the coverage tasks that are determined to be uncovered.

17. The computerized apparatus of claim 14 further comprising:
an explicit coupling measurement determinator operative to-compute the explicit coupling measurement, wherein the explicit coupling measurement is indicative of an interaction between a first code element of a first coverage task and a second code element of a second coverage task; and an implicit coupling measurement determinator operative to compute the implicit coupling measurement, wherein the implicit coupling measurement of a the first coverage and the second coverage task is indicative of an implicit association between the first code element and the second code element.

18. The computerized apparatus of claim 17, wherein said implicit coupling measurement determinator is operatively coupled to at least one of the following determinators:

a coding coupling measurement determinator operative to compute coding coupling measurement of the first coverage tasks with respect to the second coverage task, wherein the coding coupling measurement is computed as a relative portion of source code modifications made to both the first and second code elements in respect to all source code modifications made to the first code element;

a resource coupling measurement determinator operative to compute resource coupling measurements, wherein a resource coupling measurement is indicative of a use of a shared computer resource; and a performance coupling measurement determinator operative to compute performance coupling measurement, wherein the performance coupling measurement is indicative of the first code element having an effect on a performance property associated with execution of the second code element.

19. The computerized apparatus of claim 14, wherein said coupling measurement determinator is operatively coupled to an analysis module selected from the group consisting of a static analysis module and a dynamic analysis module, wherein said analysis module is configured to analyze operation of the SUT.

20. The computerized apparatus of claim 14, further comprising a test ranker operative to determine a coupling score of a test of a suite, wherein the test ranker is operative to identify coverage tasks that are covered by the test, and to aggregate the coupling scores of the identified coverage tasks.

21. The computerized apparatus of claim 20, further comprising a test selection module operative to perform test selection of a subset of the test suite having substantially equivalent coverage measurement, wherein the test selection is performed so as to give deference to a coupling score of a test.

22. A computer program product comprising:

a non-transitory computer readable medium;

a first program instruction for obtaining coverage tasks, each coverage task is associated with a code element of a Software-Under-Test (SUT);

a second program instruction for performing with respect to each coverage task:

computing a coupling score for each coverage task, wherein said computing the coupling score for a coverage task comprises:

for each other coverage task, computing coupling measurements of the coverage task with all other coverage tasks, wherein one or more measurements selected from a group consisting of an explicit coupling measurement and an implicit coupling measurement, wherein the explicit coupling measurement of a first coverage task and a second coverage task is indicative of an interaction between a first code element of the first coverage task and a second code element of the second coverage task, wherein the explicit coupling measurement is a total number of invocations of the first code element by the second code element and of invocations of the second code element by the first code element; and wherein an invocation of the first code element by the second code element is given a different weight than an invocation of the second code element by the first code element; and wherein the implicit coupling measurement of a the first coverage and the second coverage task is indicative of an implicit association between the first code element and the second code element; and aggregating the coupling measurements between the coverage task and all other tasks into the coupling score of the coverage task;

whereby a coupling measurement is computed with respect to each pair of coverage tasks in order to compute the coupling score;

a third program instruction for ranking the coverage tasks based on the coupling scores; and wherein said first, second, and third program instructions are stored on said non-transitory computer readable media.

* * * * *